UNITED STATES PATENT OFFICE.

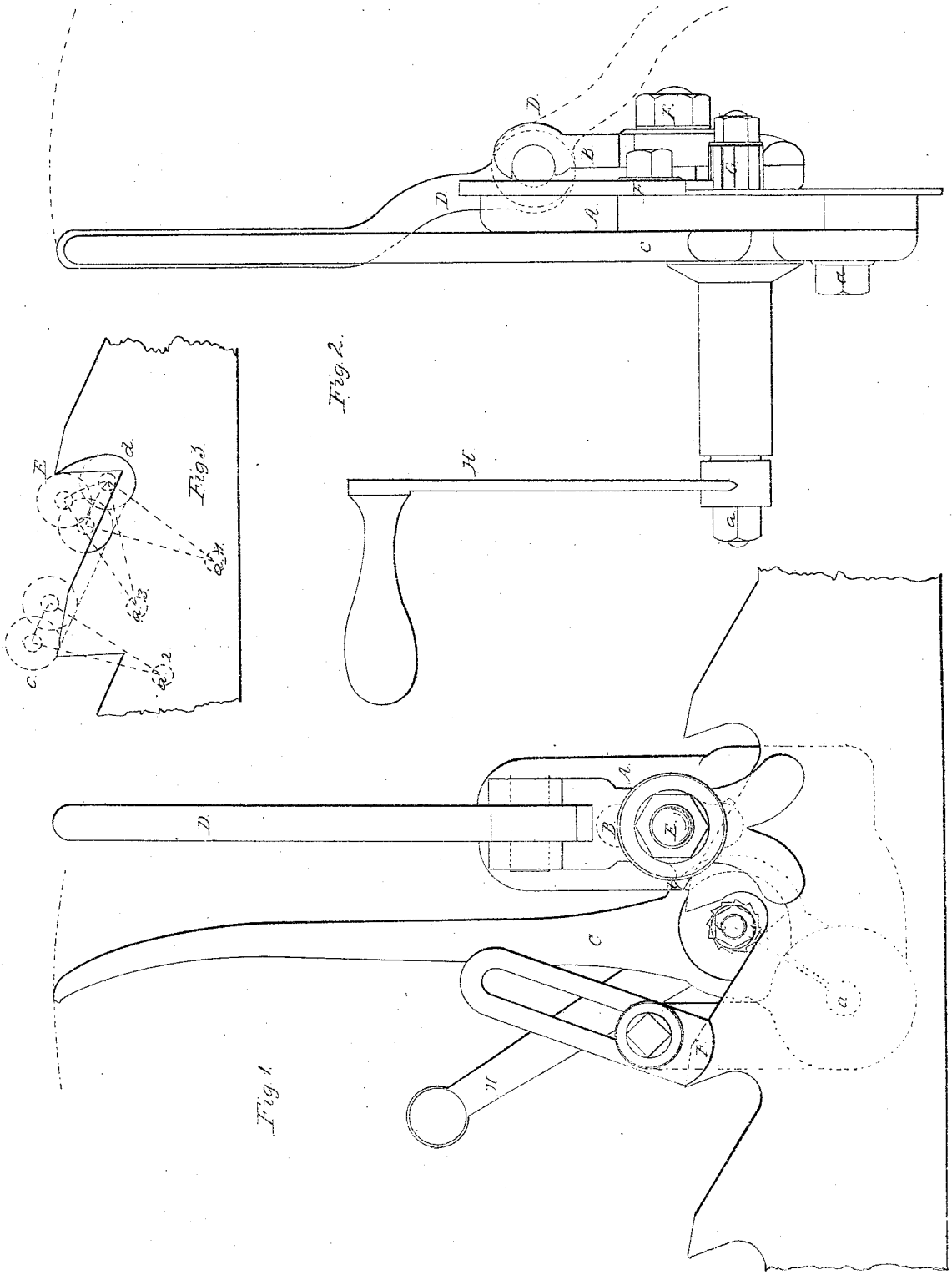

NELSON BARLOW, OF NEW YORK, N. Y.

SAW-GUMMER.

Specification of Letters Patent No. 21,935, dated November 2, 1858.

*To all whom it may concern:*

Be it known that I, NELSON BARLOW, of the city, county, and State of New York, have invented a new and Improved Saw Gummer and Sharpener; and I do hereby declare that the following is a full and exact description thereof, reference being had to the accompanying drawings, of which—

Figure 1 is a front view, Fig. 2 is a side view and Fig. 3 illustrates different applications of the tool.

A, B, is a clamp by which the tool is secured to the saw while being acted upon.

E is a bolt with a nut at each end which passes through the clamp and it has a collar intermediate, it is secured fast to the back part A, in which is a slot for adjusting the bolt and with it the front part of the clamp, up or down in any required position; the bolt rests upon the back (top) of the saw tooth acted upon, for this purpose it may be flattened on one side, or a washer having a projecting straight side as at $b$, Fig. 1, may be placed upon it; in either case it rests upon the tooth and conforms to its angle.

The upper part of the clamp B, receives an eccentric and lever D, which when thrown downward leaves the clamp free and when turned to an upright position tightens it upon the saw, it also has another and important use in connection with working the tool as explained hereafter.

C is a lever, attached at its lower end by the pivot screw $a$, to a downward projecting part of the clamp A, upon which screw it is free to move from side to side, this carries the milling cutter G, which is secured at one end of a shaft and at the other is a crank H, for operating it, its position is a little above and obliquely to the right of the screw $a$.

F, is an adjustable rest that bears upon the saw tooth in advance of the one acted upon and can be accommodated in position to the various forms of teeth; the tool has thus a bearing upon the edge of the saw at each side of the cutter either of which can be adjusted up or down the object of which is not only that the cutter may conform to teeth of different depths but that in placing it in angular positions it may cut on any desired line.

The tool being placed on the saw and adjusted in the required position, the eccentric arm D, is turned upward standing in line with the lever C, and the clamp is thus fastened; the levers are then grasped or inclosed by the left hand, as the arm D, is fixed relatively to the other it follows that as the crank is put in motion (by the right hand) and the left is closed, compressing them toward each other the cutter is fed up against the saw under the perfect control of the operator. The arm D, thus serves two purposes in a simple and effective manner.

In many cases the tool may be used only for cutting at the base of the teeth as shown in Fig. 1, the cutter standing in such position with regard to the center of action $a$, that it cuts back and downward corresponding to the natural wear of the teeth, but when it is desirable to work off the backs of the teeth the tool is placed so that the center of movement shall be as at $a$, 1, and $a$, 2, Fig. 3, dressing to the line $c$, $d$. Again by placing this center at the point indicated $a$, 3, the face of the tooth in line $e$, $d$ is worked and its point sharpened, a cutter sufficiently large may be used to cut at the base and point without change of position.

In all changes of position the rests F and E, $b$, perform an important part, in the first place in preventing the tool from shifting by any accident and secondly that each tooth may be gaged and conform exactly through the series, the angle therefore or direction given to the cutter depends upon the position of the screw $a$, and this in turn depends upon the adjusted position of the rests aforesaid. If a single lever C, or equivalent, were used, the force applied against it, especially in circular saws, would require them to be fastened to prevent turning, but by using two levers as contemplated above the pressure applied by the hand is expended within the tool itself, avoiding such tendency, while the milling is regulated or graduated with greater precision and ease. The lever D, may be a fixture, and other means be used for securing the clamp.

Having thus described my invention what I claim therein as new and desire to secure by Letters Patent is:

The herein described arrangement of levers C, and D; rests E and F, in combination with the milling cutter and clamp all substantially as set forth.

NELSON BARLOW.

Witnesses:
HARVEY BROWN,
E. H. BROWN.